W. NOAKES.
EGG BEATER.
APPLICATION FILED MAY 7, 1910.
980,824.
Patented Jan. 3, 1911.
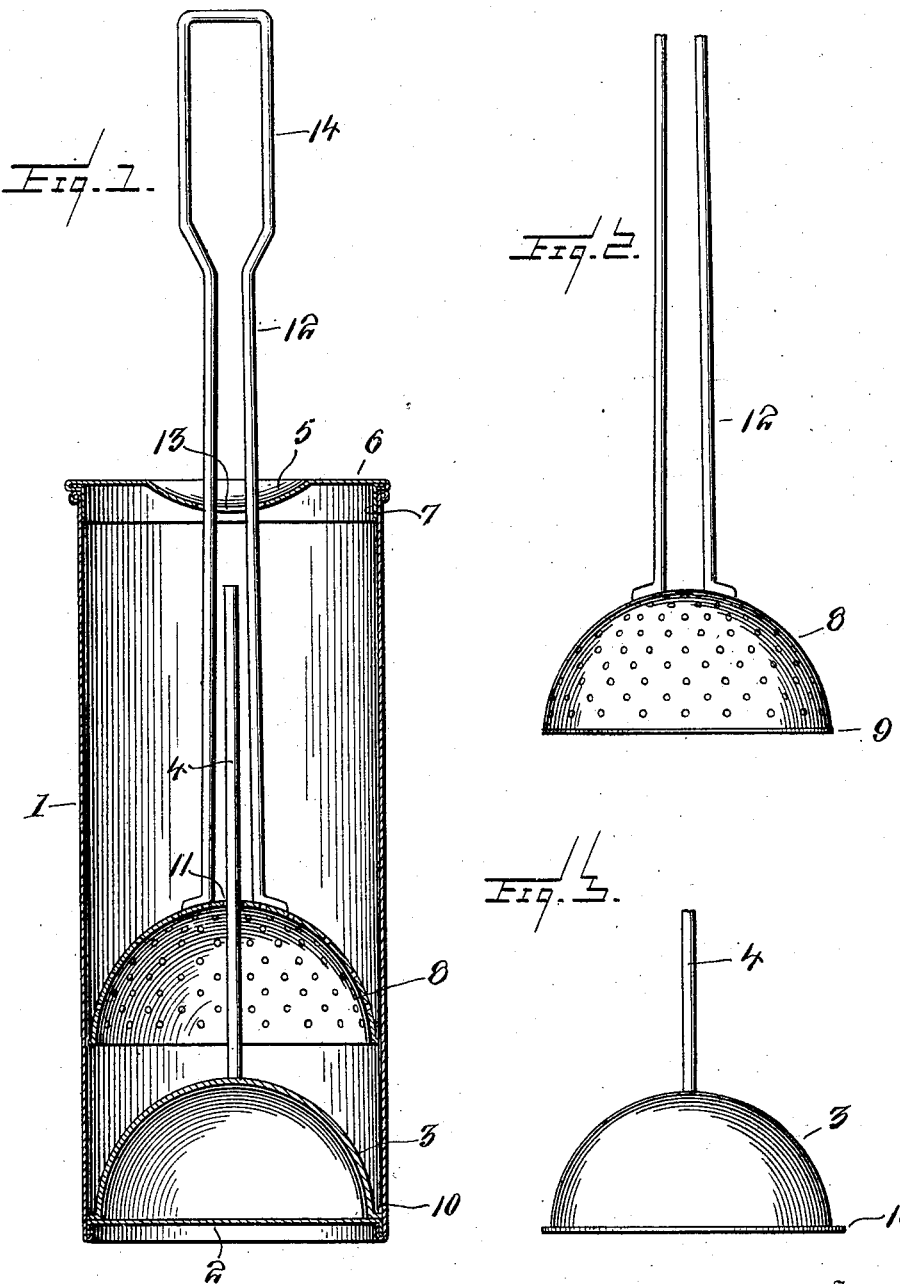
Witnesses
E. R. Ruppert
James A. Koehl
Inventor
William Noakes
By Victor J. Evans
Attorney

UNITED STATES PATENT OFFICE.

WILLIAM NOAKES, OF NORTH PORTLAND, OREGON.

EGG-BEATER.

980,824.  Specification of Letters Patent.  Patented Jan. 3, 1911.

Application filed May 7, 1910. Serial No. 559,952.

*To all whom it may concern:*

Be it known that I, WILLIAM NOAKES, a citizen of the United States of America, residing at North Portland, in the county of Multnomah and State of Oregon, have invented new and useful Improvements in Egg-Beaters, of which the following is a specification.

This invention relates to egg beaters, and has for an object to provide a receptacle having a supplemental bottom-forming element and to provide a reciprocatory dasher of a shape conforming with the said supplemental bottom, the said dasher being formed to provide a plurality of perforations to provide a thorough and a positive agitation.

A still further object of the invention is to provide a receptacle having a closure at its upper end, the said closure being formed to provide a receiver for collecting such unbeaten parts of the egg that might adhere to the operating handle or rod of the dasher, the said collector being apertured for direct communication with the receptacle of the beater so that the said unbeaten parts of the egg will be carried back to the receptacle.

In the drawing, forming a portion of this specification and in which like numerals of reference indicate similar parts in the several views:—Figure 1 is a detail vertical section through my improved egg beater. Fig. 2 is a detail side elevation of the dasher. Fig. 3 is a detail side elevation of the supplemental bottom.

My improved egg beater consists of a receptacle 1 having a bottom 2 which is disposed above the bottom edge portions of the vertical walls of the receptacle. The receptacle is of cylindrical form in cross section and on the bottom is removably fitted a supplemental bottom 3 of concavo-convex form, the said bottom having its concavity arranged immediately above the bottom 2 of the receptacle. At the center the said supplemental bottom supports a vertical guide rod 4 which terminates directly beneath the dished or collector-forming portion 5 of a removable closure 6, the said closure being formed to provide a depending flange 7 which snugly fits into the receptacle as shown in Fig. 1 of the drawing.

A dasher 8 is mounted for reciprocatory motion within the receptacle 1 and as shown, the said dasher is of concavo-convex form to conform substantially in shape with the concavo-convex supplemental bottom 3, the concavity of the said dasher being arranged to receive the convex portions of the bottom 3. The peripheral edge of the dasher is formed to provide an outwardly extending flange 9. It may be stated that the bottom 3 has its peripheral edge formed to provide an outstanding scraping flange 10. The dasher is perforated, as shown, and at the center the said dasher is formed to provide a passage 11 which receives the guide rod 4 of the supplemental bottom 3. The dasher is provided with an operating rod or handle 12 which extends upwardly through a passage 13 in the closure 6. The said handle is formed to provide a manipulating portion 14 which is located at a point directly above the collector-forming portion 5 of the closure.

The supplemental bottom 3 is removable, likewise the reciprocatory dasher and after operation of the device the said removable elements thereof may be withdrawn from the receptacle to permit of a convenient cleaning of the same as will be understood.

In operation of the device, the closure 6 is removed and the eggs to be beaten are poured into the receptacle and directly onto the supplemental bottom 3. The closure 6 is then fitted to the receptacle and the portion 14 of the dasher is manipulated to impart to the said dasher the desired reciprocatory movement so as to move the same toward and away from the said supplemental bottom. A device constructed as herein described and shown, is extremely simple and has been found most effective for the purpose intended. While it is designed for use particularly as an egg beater it will of course serve as a very efficient culinary article where a mixing process of food stuffs is required. After the eggs have been thoroughly beaten the closure 6 is removed and by drawing outwardly on the manipulating portion 14 of the handle 12 the dasher will be withdrawn and it will carry therewith most of the beaten eggs. Upon removal of the supplemental bottom 3 such parts of the eggs that remain after withdrawal of the dasher will be collected and removed. The unbeaten parts of the eggs which accumulate on the handle portion 12 of the dasher will be taken up by the collector 5 and conveyed back to the receptacle by way of the passage 13. The dasher 4 is somewhat smaller than the transverse diameter of the receptacle 1 so as to provide for an effective reciprocation of the dasher and to prevent its walls from coming in direct contact with the walls of the receptacle.

I claim:—

1. A device of the class described comprising a receptacle having a fixed main bottom and a supplemental removable bottom, a guide rod supported by the said supplemental bottom, a dasher mounted to slide on the said guide rod, and a closure at the outer end of the said receptacle and formed to provide a collector of dished-form which extends downwardly into the receptacle.

2. A device of the class described comprising a receptacle having a removable auxiliary bottom, a closure at the opposite end of the receptacle, a dasher mounted for reciprocatory movement in the receptacle and having a peripheral edge portion, the said auxiliary bottom having a flanged scraping portion for engaging the interior surfaces of the walls of the receptacle in removal of said bottom, and a handle supported by the dasher and movable through the said closure.

3. A device of the class described comprising a receptacle having an auxiliary bottom of concavo-convex form, the said bottom being formed to provide an annular scraping flange for engaging the interior surface of the receptacle in withdrawal of the bottom, a guide rod extending longitudinally of the receptacle, a dasher of concavo-convex form slidably mounted on the guide rod, a closure at the outer end of the receptacle, and a handle supported by the dasher and extending through the said closure.

In testimony whereof I affix my signature in presence of two witnesses.

WILLIAM NOAKES.

Witnesses:
H. H. NEWHALL,
D. D. COULSON.